July 5, 1932.  T. E. HERLIHY  1,866,106
LUBRICANT DISPENSING APPARATUS
Original Filed Nov 20, 1928   3 Sheets-Sheet 2
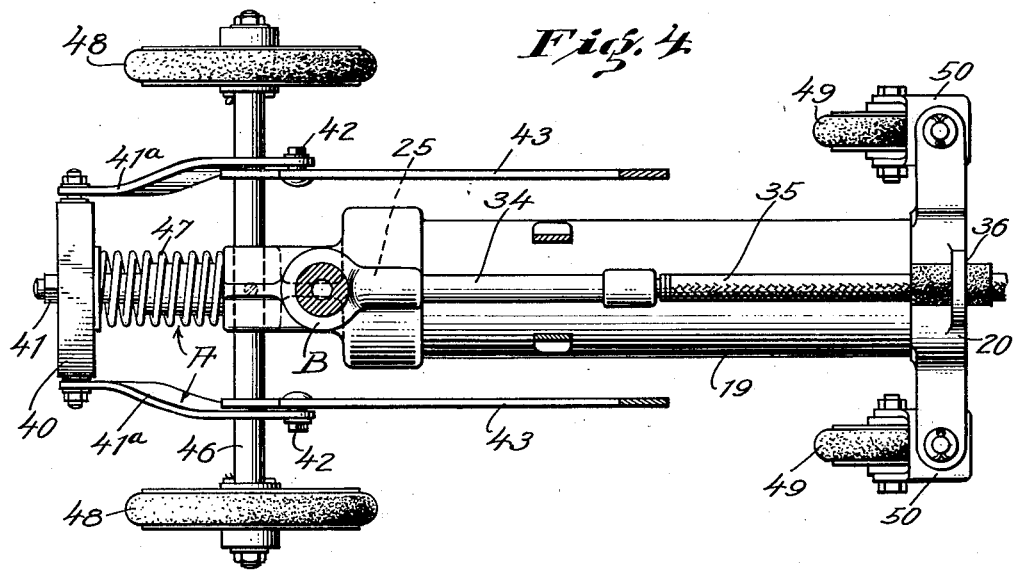
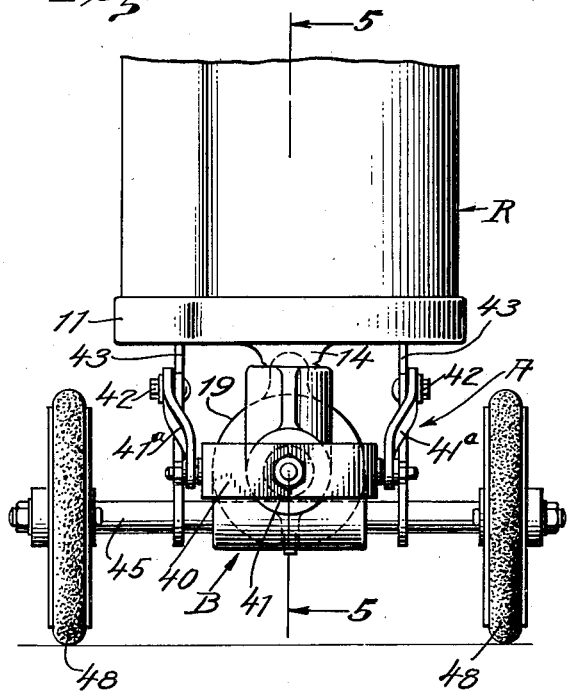
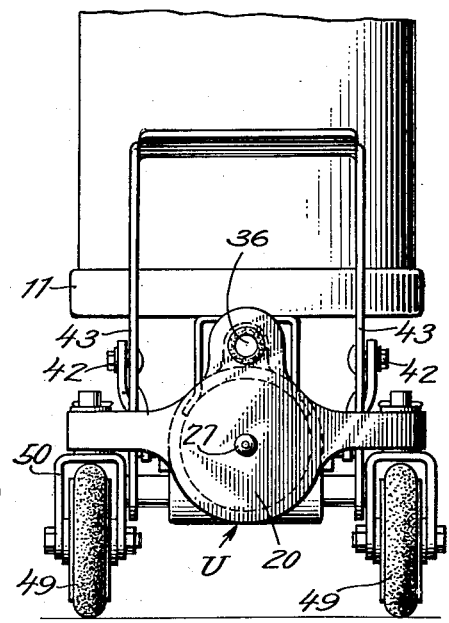
INVENTOR.
Theodore E. Herlihy
BY *Munn & Co*
ATTORNEYS.

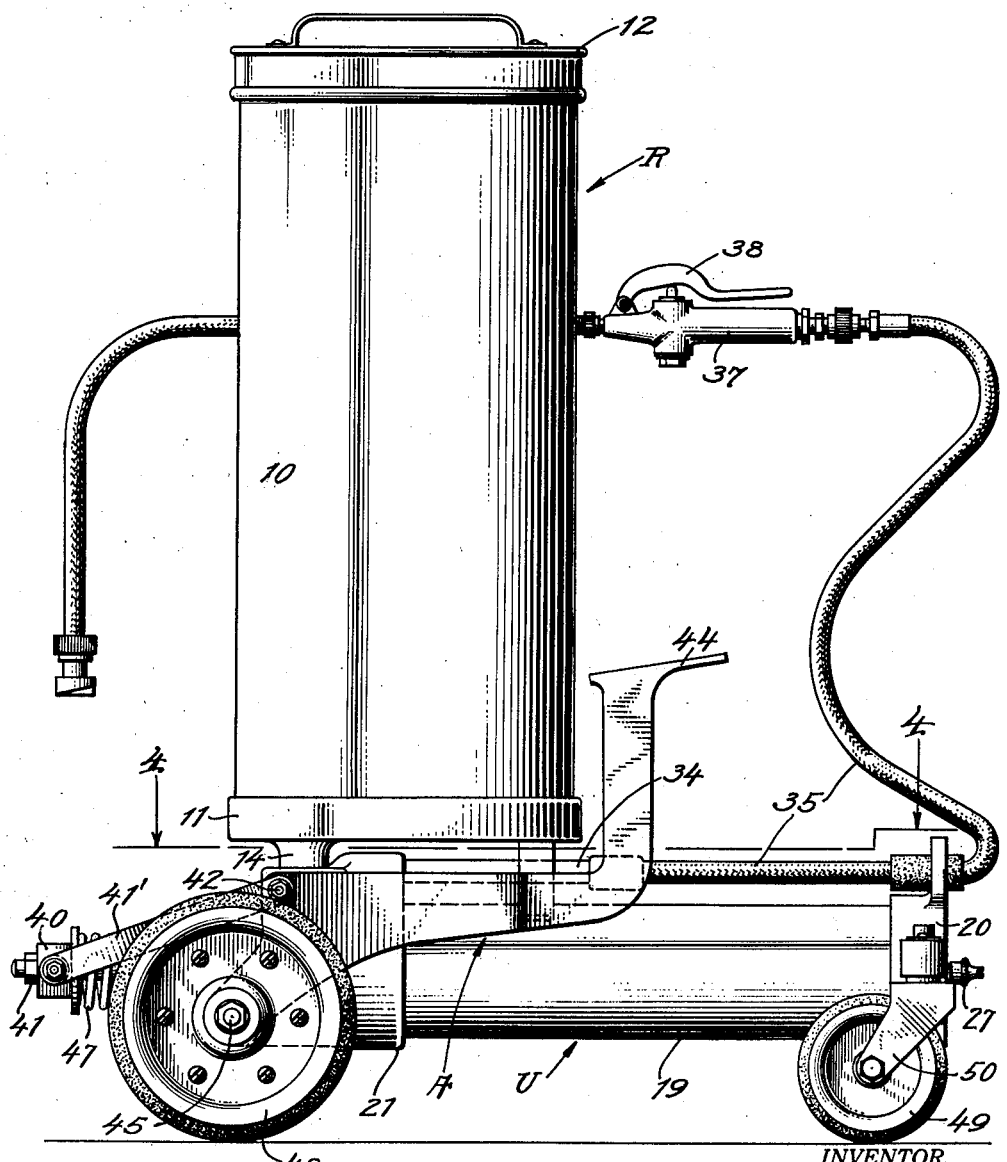

July 5, 1932. T. E. HERLIHY 1,866,106
LUBRICANT DISPENSING APPARATUS
Original Filed Nov. 20, 1928  3 Sheets-Sheet 3
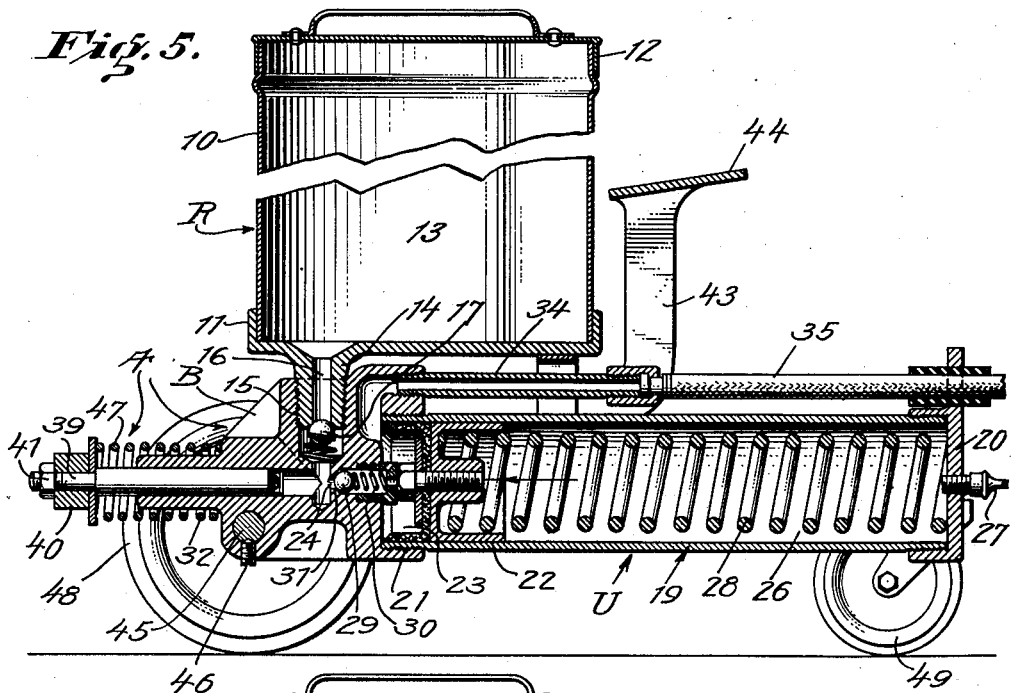
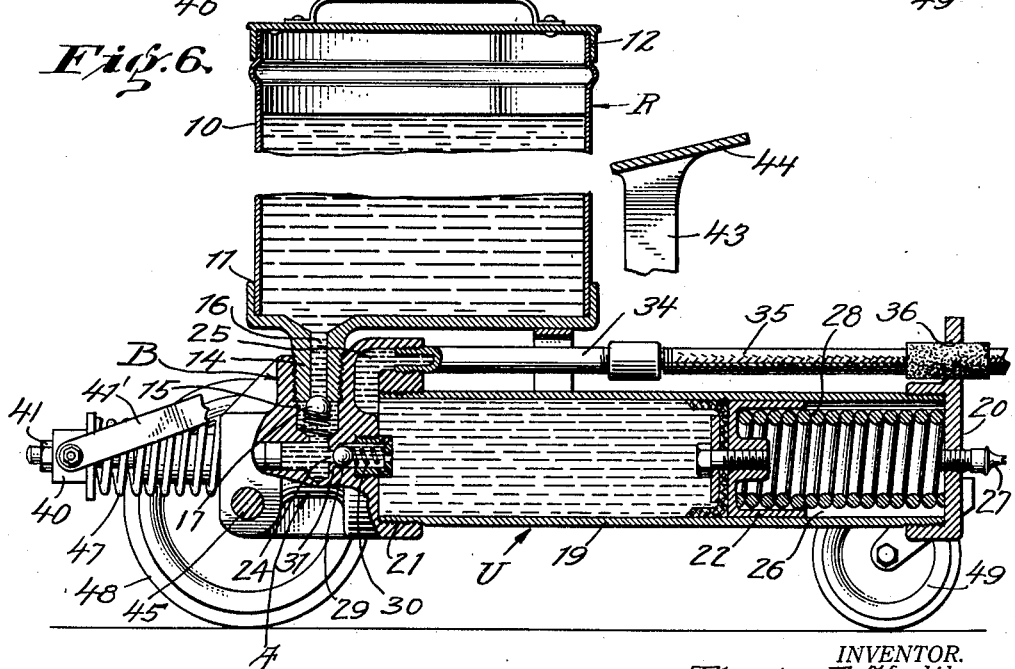
INVENTOR.
Theodore E. Herlihy
BY
ATTORNEYS.

Patented July 5, 1932

1,866,106

UNITED STATES PATENT OFFICE

THEODORE E. HERLIHY, OF LOS ANGELES, CALIFORNIA, ASSIGNOR, BY DIRECT AND MESNE ASSIGNMENTS, TO THE LUBRICATION CORPORATION, OF SOUTH BEND, INDIANA, A CORPORATION OF DELAWARE

LUBRICANT DISPENSING APPARATUS

Application filed November 20, 1928, Serial No. 320,652. Renewed June 1, 1931.

My invention relates to and has for a purpose the provision of a lubricant dispensing apparatus by which quantities of lubricant can, with the utmost ease and dispatch, be transferred from a source of supply to a dispensing unit, and placed under a tremendously high pressure in the unit for ejection from the latter with sufficient force to insure that lubricant will be delivered to instrumentalities to be lubricated, against the high resistance to the passage of lubricant encountered in many forms of mechanisms.

It is a further purpose of my invention to provide a lubricant dispensing apparatus, particularly adapted, although not necessarily, for use in service stations and garages to lubricate the various parts of a motor vehicle provided with suitable valved fittings such as are used in the well known Alemite and Zerk lubricating systems, the apparatus preferably being portable to permit convenient transportation thereof from place to place, and embodying a receptacle in which a relatively large quantity of lubricant is adapted to be stored; and a dispensing unit into which a relatively small quantity of lubricant is adapted to be forced from the receptacle by a manually operable pump, and placed under high pressure in the unit for ejection from the latter under the control of an operator.

I will describe only one form of lubricant dispensing apparatus embodying my invention, and will then point out the novel features thereof in claims.

In the accompanying drawings

Fig. 1 is a view showing in side elevation one form of lubricant dispensing apparatus embodying my invention;

Figs. 2 and 3 are views in elevation, looking from opposite ends of the apparatus shown in Fig. 1;

Fig. 4 is a horizontal sectional view taken on the line 4—4 of Fig. 1;

Fig. 5 is an enlarged vertical sectional view of the apparatus, taken on the line 5—5 of Fig. 2, and illustrating certain movable parts of the apparatus in one position; and Fig. 6 is a view similar to Fig. 5 and illustrating the dispensing unit filled to capacity with lubricant.

Referring specifically to the drawings in which similar reference characters designate similar parts in each of the several views, my invention broadly comprises a lubricant storage receptable R, a lubricant dispensing unit U adapted to receive a relatively small quantity of lubricant from the receptacle and to place the lubricant under high pressure for ejection from the unit to the instrumentalities to be lubricated, and a means designated generally at A by which lubricant is adapted to be transferred from the receptacle to the unit to charge the latter whenever the supply of lubricant in the unit requires replenishing.

The receptacle R in the present instance comprises a vertically disposed open ended cylinder 10 having its lower end closed by a head 11 and its upper end closed by a removable cover 12 to permit lubricant such as grease, for example, to be supplied to the receptacle. The interior of the receptacle constitutes a lubricant storage chamber 13 for storing a large quantity of lubricant, and the receptacle is supported in a vertical position on a metal body designated generally at B. To this end the head 11 is provided with a depending externally threaded extension 14 which is threaded into a pocket 15 formed in the body and is tubular to provide an outlet 16 leading from the chamber 13 into the pocket 15.

The outlet 16 is controlled by a valve 17 in the form of a ball mounted in the pocket 15 and opening outwardly of the chamber 13, the valve being normally urged to close the outlet 16 by a spring 18 seating in the pocket 15, so that the valve constitutes a one-way valve and only opens to permit the flow of lubricant from the chamber 13 through the outlet 16.

The dispensing unit U in the present instance comprises an open ended cylinder 19 closed at one end by a head 20 and threaded at its other end into a pocket 21 formed in the body B so as to project horizontally from the body. Within the cylinder 19 is a piston 22 which divides the cylinder interiorly into a lubricant receiving chamber 23 having an inlet 24 and outlet 25, and a second chamber 26 into which air under pressure is adapted to be supplied through a one-way valve 27 mounted in the head 20. Under the expansive action of the air confined in the chamber 23, the piston 22 will be normally urged to one extreme position as indicated by the arrow in Fig. 5, and to aid the air in its urging action a coiled expansible spring 28 is mounted in the chamber 26 between the piston 22 and head 20.

The inlet 24 is in the form of a duct in the body B, communicating with the pocket 15 in the body and is controlled by a valve 29 in the form of a ball opening inwardly of the chamber 23 and normally urged by a spring 30 into engagement with a seat 31, to close the inlet 24, so that the valve constitutes a one-way valve and only opens to permit the flow of lubricant from the receptacle through its outlet 16 into the chamber 23 through its inlet 24.

The means A above referred to, for transferring lubricant from the receptacle R to the unit U, is in the present instance illustrated as a pump of which the valves 17 and 29 form a part, and includes a piston 32 mounted for reciprocating movement in a bore 33 formed in the body B and communicating with the pocket 15 in the body. It will be clear that the piston 32 operates when reciprocated, to alternately induce suction, causing the normally closed valve 17 to open and permit withdrawal of a quantity of lubricant from the storage chamber 13 through its outlet 16 into the pocket 15 and bore 33, and create pressure to force the normally closed valve 29 open and permit the charge of lubricant withdrawn from the storage chamber to be forced by the piston 32 into the receiving chamber 23 through its inlet 24.

To the outlet 25 of the lubricant receiving chamber 23 is connected a pipe 34, and to the pipe is connected a length of high pressure flexible hose 35 which is threaded loosely through a guiding eye 36 formed on the head 20 and is provided at its free extremity with a normally closed dispensing valve 37 of conventional form, adapted to be manually opened by pressure exerted upon a lever 38. The valve 37 broadly constitutes a means for controlling the discharge of lubricant from the outlet 25 of the receiving chamber.

In the present instance the pump piston 32 is adapted to be manually actuated, and to this end the outer end of the piston is provided with a reduced extension 39 on which is mounted a cross head 40 secured to the piston by a nut 41 threaded on the extension. Pivotally connected to opposite ends of the cross head 40 are one of the ends of a pair of links 41ª, while the other ends of the links are pivotally connected at 42 to a pair of substantially Z shaped arms 43 connected together at one of their ends in side by side spaced relation by a foot pedal 44. The opposite ends of the arms 43 are pivotally mounted at opposite sides of the body B on the projecting ends of a horizontal shaft 45 extending through the body and fixed against displacement in the body by a set screw 46.

The arms 43 and pedal 44 together constitute a foot actuated member which is normally urged to an elevated position and the piston 32 to one of its extreme positions by a coiled expansible spring 47 interposed between the cross head 40 and the body B. It will thus be clear that by depressing the foot pedal 44, a pull will be exerted upon the links 41ª to move the piston 32 to its other extreme position, so that by alternately depressing and releasing the pedal the piston 32 will be reciprocated and will pump lubricant from the storage chamber 13 to the receiving chamber 23.

The shaft 45 in the present instance constitutes an axle on the extremities of which are rotatably mounted a pair of wheels 48 co-operating with a pair of caster wheels 49 mounted in brackets 50 projecting from the head 20, to support the lubricant dispensing apparatus for rolling movement and thus render the apparatus portable.

The operation of the lubricant dispensing apparatus is as follows:

Let it be assumed that a quantity of lubricant has been placed in the storage chamber 13 and that the receiving chamber 23 is empty so that the piston 22 will occupy the extreme position shown in Fig. 5, under the urging action of the spring 28 and the expansive action of the air in the chamber 26. The foot pedal 44 is now alternately depressed and released to cause the piston 32 to withdraw charges of lubricant from the storage chamber and force the charges into the receiving chamber 23, the spring 28 and the air in the chamber 26 yielding to the incoming lubricant to permit the piston 22 to be forced by the lubricant towards its other extreme position, thus storing up further energy in the spring 28 and further compressing the originally compressed air in the chamber 26. It will be understood that the lubricant forced into the receiving chamber 23 will also fill the pipe 34 and hose 35 up to the normally closed dispensing valve 37, and that when the piston 22 has been moved a sufficient distance by the incoming lubricant to compress the spring 28 to its fullest extent, as shown in Fig. 6, the spring and air combined will exert a tremendously high pressure upon the piston tending to forcibly eject the lubricant in the receiving chamber therefrom through its outlet 25, so that upon opening the dispensing valve 37 a stream of lubricant will discharge from the valve at a tremendously high velocity and pressure. When the supply of lubricant in the chamber 23 is exhausted, it is only necessary for the operator to again actuate the pedal 44 until the chamber 23 is again filled to capacity, and the apparatus will then be ready for further lubricating operations. It will be clear that the spring 28 and air in the chamber 26 co-operate with the piston 22 to broadly constitute a means for placing lubricant in the receiving chamber 23 under a tremendously high pressure as the lubricant is pumped into the receiving chamber.

To the nozzle 51 of the valve 37 is adapted to be secured a short length of flexible hose 52 having a connector 53 of conventional form such as is used in conjunction with the conventional valved fittings (not shown) applied to a motor vehicle and communicating with various parts of the vehicle to be lubricated.

From the foregoing description it will be clear that the apparatus provides a compact and portable unit by which a relatively large quantity of lubricant can be conveniently transported from place to place, and relatively small quantities of the lubricant placed under a tremendously high pressure and dispensed at will with the utmost ease and dispatch to insure that the lubricant will be positively forced against high resistance to the parts of the vehicle to be lubricated.

It will be appreciated that either the spring 28 or the air in the chamber 26 could be dispensed with and the other relied upon to place the lubricant in the receiving chamber 23 under high pressure, although it has been found in practice that the use of both is desirable, as air can be readily supplied to the chamber 26 from the usual air hose provided in service stations and requires replenishing only at long intervals.

Although I have herein shown and described only one form of lubricant dispensing apparatus embodying my invention, it is to be understood that various changes and modifications may be made therein without departing from the spirit of the invention and the spirit and scope of the appended claims.

I claim:

1. A lubricant dispensing apparatus comprising a cylinder, a piston in the cylinder dividing the latter into a lubricant receiving chamber having an outlet and a second chamber having a valve controlled inlet through which air under pressure is adapted to be supplied to the second chamber normally to urge the piston to one extreme position, means for pumping lubricant into the receiving chamber to force the piston to another extreme position against the expansive action of the air in the second mentioned chamber so that the air will be further compressed by the piston to such extent as to operate under its expansive action to place the lubricant in the receiving chamber under a high pressure and thereby tend forcibly to eject the lubricant from the receiving chamber through its outlet, and means for controlling the ejection of lubricant from said outlet.

2. A lubricant dispensing apparatus comprising a storage chamber having an outlet, a one-way valve controlling the outlet and opening outwardly of the chamber, a cylinder, a piston in the cylinder dividing the latter into a lubricant receiving chamber having an inlet and an outlet and a second chamber having a valve controlled inlet through which air under pressure is adapted to be supplied to the second chamber normally to urge the piston towards one extreme position, a one-way valve controlling the inlet of the receiving chamber and opening inwardly of the latter, means for withdrawing lubricant from the storage chamber through its outlet and forcing the lubricant into the receiving chamber through its inlet to force the piston towards another extreme position against the expansive action of the air in the second chamber, so that the air will be further compressed by the piston to such extent as to operate under its expansive action to urge the piston towards its first mentioned extreme position and thereby cause the piston forcibly to eject the lubricant from the receiving chamber through its outlet at a high pressure, and means for controlling the ejection of lubricant from the outlet of the receiving chamber.

3. A lubricant dispensing apparatus comprising a body, a lubricant container supported on the body and having an outlet, a one-way valve controlling the outlet and opening outwardly of the container, a cylinder on the body, a piston in the cylinder dividing the latter into a lubricant receiving chamber having an inlet and an outlet and a second chamber, means in the second chamber for normally urging the piston to one extreme position, a pump in the body including a reciprocating piston for withdrawing lubricant from the container through its outlet and forcing the lubricant into the receiving chamber through its inlet for ejection by the piston in the cylinder through the outlet of the receiving chamber, means for controlling the ejection of lubricant from the receiving chamber, and manually operable means for reciprocating the pump piston.

4. A lubricant dispensing apparatus comprising a body, a lubricant container supported on the body and having an outlet, a one-way valve controlling the outlet and opening outwardly of the container, a cylinder on the body, a piston in the cylinder dividing the latter into a lubricant receiving chamber having an inlet and an outlet and a second chamber, means in the second chamber for normally urging the piston to one extreme position, a pump in the body including a reciprocating piston for withdrawing lubricant from the container through its outlet and forcing the lubricant into the receiving chamber through its inlet for ejection by the piston in the cylinder through the outlet of the receiving chamber, means for controlling the ejection of lubricant from the receiving chamber, said pump piston being normally urged to one extreme position, and manually operable means for moving the pump piston to its other extreme position comprising a cross head connected to the piston, a foot actuated lever, and links connecting the cross head and lever.

5. A portable lubricant dispensing apparatus comprising a body, a lubricant storage receptacle supported on the body, a lubricant dispensing unit on the body, an axle mounted in the body, wheels carried by the axle for supporting the apparatus for rolling movement, a pump in the body for transferring lubricant from the storage receptacle to the lubricant dispensing unit, including a piston normally urged to one position, and manually operable means for moving the piston to another position comprising a cross head connected to the piston, a pair of spaced apart arms disposed on opposite sides of the body and mounted on said axle for rocking movement, a pedal connecting the arms, and a pair of links connecting the cross head and arms.

6. A lubricant dispensing apparatus comprising a lubricant storage chamber having an outlet, a cylinder, a piston working in the cylinder and dividing the latter into a lubricant receiving chamber having an inlet and an outlet and a second chamber, means in the second chamber for urging the piston to one extreme position, means for withdrawing lubricant from the storage chamber through its outlet and forcing the lubricant into the receiving chamber through its inlet for ejection by the piston through the outlet of the receiving chamber, and means for controlling the ejection of lubricant from the receiving chamber.

7. A lubricant dispensing apparatus comprising a lubricant storage chamber having an outlet, a one-way valve controlling the outlet and opening outwardly of the chamber, a lubricant receiving chamber having an inlet and an outlet, a one-way valve controlling the inlet and opening inwardly of the receiving chamber, means for withdrawing lubricant from the storage chamber through its outlet and forcing the lubricant through the inlet of the receiving chamber into the same, means including a piston and a compressible fluid behind the piston for placing the lubricant introduced into the receiving chamber under pressure, and means for controlling the discharge of lubricant from the outlet of the receiving chamber.

8. A lubricant dispensing apparatus comprising a lubricant storage chamber having an outlet, a one-way valve controlling the outlet and opening outwardly of the chamber, a lubricant receiving chamber having an inlet and an outlet, a one-way valve controlling the inlet and opening inwardly of the receiving chamber, means for withdrawing lubricant from the storage chamber through its outlet and forcing the lubricant through the inlet of the receiving chamber into the same, means including a spring pressed piston for yieldingly resisting the admission of lubricant into the receiving chamber and operating to set up pressure upon the lubricant forced into the latter so as to tend to eject the lubricant from the receiving chamber through its outlet, and means for controlling the discharge of lubricant from the outlet.

9. A lubricant dispensing apparatus comprising a lubricant storage chamber, a lubricant receiving chamber having an outlet, pressure creating means including a spring in said receiving chamber, means for forcing lubricant from the storage chamber into said receiving chamber against the action of said pressure creating means so that the latter will place the lubricant under high pressure and tend to eject the lubricant from the receiving chamber through its outlet, and means for controlling the discharge of lubricant from said outlet.

10. A lubricant dispensing apparatus comprising a lubricant storage chamber, a lubricant receiving chamber having an outlet, means for forcing lubricant from the storage chamber into the receiving chamber, a piston in said receiving chamber having one side operative against lubricant inserted in said receiving chamber, means for introducing a compressible fluid on the other side of said piston within said receiving chamber, and means for controlling the discharge of lubricant through said outlet.

11. A lubricant dispensing apparatus comprising a lubricant storage chamber having an outlet, a lubricant receiving chamber having an inlet and an outlet, a connection between the outlet of said storage chamber and the inlet of said receiving chamber, means for forcing lubricant from the storage chamber through said connection into the receiving chamber, a piston in said receiving chamber having one side operative against lubricant received in said receiving chamber, means for introducing compressed air on the other side of said piston within said receiving chamber for ejecting lubricant therefrom through its outlet, and means for controlling the flow of lubricant through said receiving chamber outlet.

12. A lubricant dispensing apparatus comprising a body, a lubricant container supported on the body and having an outlet, a one-way valve controlling said outlet and opening outwardly of the container, a cylinder on the body, a piston in the cylinder dividing the latter into a lubricant receiving chamber and a second chamber, means for applying a force against the piston from said second chamber side for moving said piston toward said lubricant receiving chamber, a pump mounted on said body, said pump including a cylinder communicable with said container and a piston operable in the cylinder, means normally urging said pump piston toward one extreme position, manually operable means for urging said pump piston toward its other extreme position including a lever and connections between the lever and said pump piston, and means for controlling the flow of lubricant from said lubricant receiving chamber.

Signed at Los Angeles, in the county of Los Angeles and State of California, this 26th day of October, A. D. 1928.

THEODORE E. HERLIHY.